E. E. LEACH.
THILL AND POLE ATTACHMENT.

No. 178,861. Patented June 20, 1876.

Witnesses:
L. M. Harris
Heinrich F. Bruns

Edwin E. Leach,
Inventor.
By Coburn & Thatcher
Attys.

UNITED STATES PATENT OFFICE.

EDWIN E. LEACH, OF CEDAR RAPIDS, IOWA.

IMPROVEMENT IN THILL AND POLE ATTACHMENTS.

Specification forming part of Letters Patent No. 178,861, dated June 20, 1876; application filed February 17, 1876.

*To all whom it may concern:*

Be it known that I, EDWIN E. LEACH, of Cedar Rapids, in the county of Linn and State of Iowa, have invented a new and useful Improvement in Thill and Pole Attachments for Carriages, Agricultural Machines, &c., which is fully described in the following specification, reference being had to the accompanying drawings, in which—

Figure 1:
Figure 2:
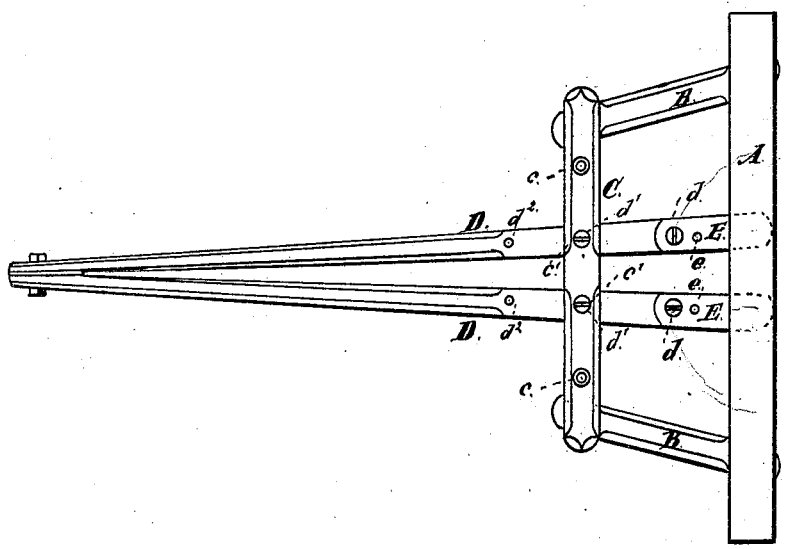
Figure 3:
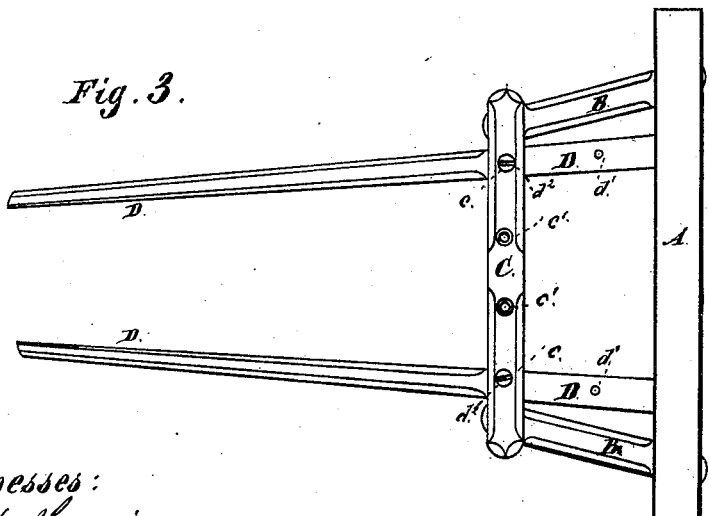

Figure 1 represents a side view of the attachment arranged for use as a pole with two horses; Fig. 2, a plan view of the same; Fig. 3, a plan view of the attachment arranged as thills for use with one horse only, and Fig. 4 a plan view of the same inverted.

The object of my invention is to provide a combined thill and pole attachment, which may be readily adjusted so as to form a pole for use with two horses, or thills for use with one horse.

The invention consists in attaching the thills to the hounds in such a manner that they may be readily detached and brought together and united, so as to form a tongue or pole.

Figure 4:
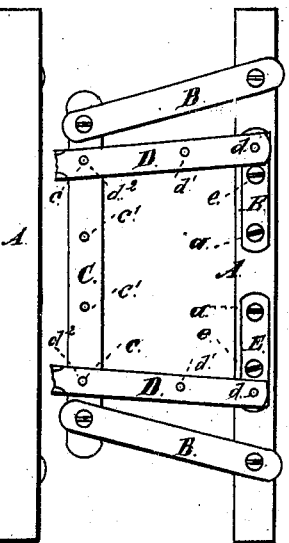

In the drawings, A represents a cross-bar, from which two arms, B B, project forward, which are inclined toward each other, and are united at their forward ends by a bar, C, the whole constituting a hound-frame. The thills D D are attached to the rear bar A by means of metallic plates E, which are pivoted to the under side of the bar A at $a$, and to the rear ends of the thills D at $d$. The thills D D are provided with two sets of holes, one set, $d^1 d^1$, being near their rear ends, and the other, $d^2 d^2$, a little farther forward. The cross-bar C is pierced with four holes, two of which, $c$, are near its outer ends, and two, $c'$, near its center. When a thill attachment is desired the thills D D are separated from each other and pushed backward until the holes $d^2$ come directly beneath the outside holes $c\ c$ in the bar C. The metallic plates E, being pivoted to both the bar A and the thills D, will swing back underneath the bar A, and the holes $d^2$ are so arranged that when the thills are in the position shown in Fig. 3 the plates will be directly underneath the bar A, as seen in Fig. 4. When the thills are in this position suitable bolts are passed through the holes $c\ d^2$, and properly secured. The plates E are also fastened to the bar A by means of bolts or screws passing through holes $e$ in the plate into the bar.

When it is desired to change the thills to a pole attachment the bolts are removed from the holes $c$ in the bar C, and from the holes $e$ in the pivoted plates. The thills D are then drawn forward, thus straightening out the plates E and bringing the thills together at their forward ends, as seen in Fig. 2. They are also very near together when they pass under the bar C, and the holes $d^2\ d^2$ are brought directly under the holes $c'$ in the bar, and the thills are secured in position by passing suitable bolts through the holes. The forward ends of the thills are also bolted together, a metallic plate being placed between them to serve as stop for the neck-yoke.

This device is especially adapted for use upon farms, as it may be readily adjusted for wagons, horse-rakes, and other agricultural machines.

Having thus described my invention, what I claim as new, and desire to secure by Letters Patent, is—

1. A combined thill and pole attachment, the thills being permanently attached to a supporting-frame by means of pivoted plates E swinging in horizontal planes, but otherwise detachable and adjustable, so as to be brought together and fastened to form a pole, substantially as described.

2. The combination, substantially as described, of the thills D, provided with two sets of holes, $d^1\ d^2$, the swinging plates E, bar A, and cross-bar C, provided with holes $c\ c'$, for the purpose set forth.

EDWIN E. LEACH.

Witnesses:
THOMAS C. CONNOLLY,
ULYSSES G. WHITE.